United States Patent [19]

Fan

[11] Patent Number: 5,339,170
[45] Date of Patent: Aug. 16, 1994

[54] IMAGE PROCESSING SYSTEM AND METHOD EMPLOYING HYBRID FILTERING TO PROVIDE IMPROVED RECONSTRUCTION OF CONTINUOUS TONE IMAGES FROM HALFTONE SCREEN-STRUCTURED IMAGES

[75] Inventor: Zhigang Fan, Webster, N.Y.

[73] Assignee: Xerox Corporation, Stamford, Conn.

[21] Appl. No.: 815,219

[22] Filed: Dec. 31, 1991

[51] Int. Cl.$^5$ ............................................. H04N 1/40
[52] U.S. Cl. ................................... 358/456; 358/457; 358/461; 358/462; 358/447; 382/54
[58] Field of Search ............... 382/22, 54; 358/455, 358/456, 457, 458, 461, 463, 447, 448, 462, 464

[56] References Cited

U.S. PATENT DOCUMENTS

| | | | |
|---|---|---|---|
| 4,194,221 | 3/1980 | Stoffel | 358/456 |
| 4,638,369 | 7/1987 | Hsieh | 382/54 |
| 4,717,964 | 1/1988 | Abe et al. | 358/283 |
| 4,722,008 | 1/1988 | Ibaraki | 358/283 |
| 4,811,115 | 3/1989 | Lin et al. | 358/283 |
| 4,841,377 | 6/1989 | Hiratsuka et al. | 358/283 |
| 4,901,363 | 2/1990 | Toyokawa | 382/56 |
| 4,903,142 | 2/1990 | Hasebe et al. | 358/457 |
| 5,027,078 | 6/1991 | Fan | 358/456 |
| 5,031,227 | 7/1991 | Raasch et al. | 382/22 |
| 5,050,227 | 9/1991 | Furusawa et al. | 382/22 |
| 5,054,100 | 10/1991 | Tai | 382/54 |
| 5,134,667 | 7/1992 | Suzuki | 382/22 |

Primary Examiner—Richard E. Chilcot, Jr.
Assistant Examiner—Raphael Bacares
Attorney, Agent, or Firm—Finnegan, Henderson, Farabow, Garrett & Dunner

[57] ABSTRACT

An image processing system converts screen structured halftone images to continuous tone images. Value data is sequentially generated for successive pixels of a halftone image. An averaging filter is provided for sequentially filtering each pixel in the halftone image in the horizontal image direction in accordance with a first predetermined filter to generate an intermediately filtered image. A pattern matching filter then sequentially filters each pixel in the intermediately filtered image in the vertical direction to generate a hybrid filtered image. The hybrid filter arrangement is then iteratively operated for three additional sets of orthogonal directions, i.e. the vertical and horizontal directions, a first diagonal direction and a second diagonal direction, and the second and first diagonal directions. The best hybrid image is generated as an output continuous tone image for storage and/or processing to a halftone copy or print.

5 Claims, 7 Drawing Sheets

FIGURE 6
31
| 1 | 2 | 8 | 7 |
|---|---|---|---|
| 4 | 3 | 5 | 6 |
FIGURE 7
GREY LEVEL
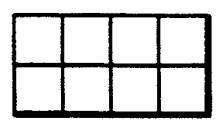 0
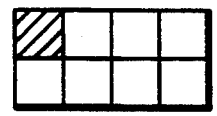 1
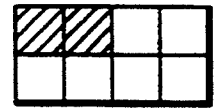 2
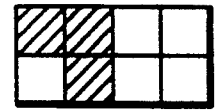 3   34
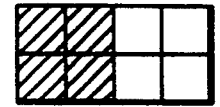 4
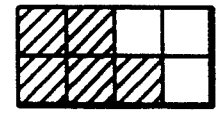 5
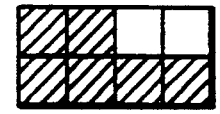 6
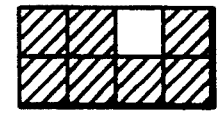 7
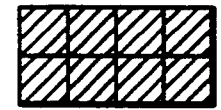 8
FIGURE 8
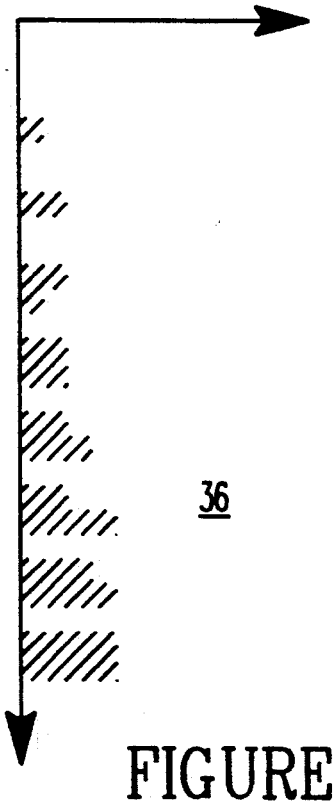
INTENSITY
36
Y

IMAGE PROCESSING SYSTEM AND METHOD EMPLOYING HYBRID FILTERING TO PROVIDE IMPROVED RECONSTRUCTION OF CONTINUOUS TONE IMAGES FROM HALFTONE SCREEN-STRUCTURED IMAGES

CROSS-REFERENCE TO RELATED APPLICATIONS

Reference is made to the following concurrently filed patent applications that are assigned to the present assignee and are hereby incorporated by reference: None.

BACKGROUND OF THE INVENTION

The present invention relates to image processing systems and methods having a capability for processing halftone images to retrieve continuous tone images and more particularly to systems and methods for converting screen-structured scanned or orthographic halftone images to continuous tone images.

Continuous tone images are converted to halftone or binary images to enable the production of printed copies. In binary form, the image has pixels which are either black or white and which are printed by applying ink or not applying ink.

It is usually difficult to process a halftone image such as for scaling and enhancement. Often, moire or distortion is introduced. Normally, therefore, the halftone image is first reconverted to a continuous tone image to enable processing and thereafter reconverted to a halftone image for printing.

Image processing systems used with printers in reprographic systems typically require a capability for converting halftone images to continuous tone images to meet reconversion needs and for converting scanned halftone images to continuous tone images that can then be processed by any of a large variety of enhancement algorithms commonly available for continuous tone images.

The halftoning process loses some image information in the conversion of the original continuous tone image to a halftone image. The reconversion of a halftone image to a continuous tone image accordingly is essentially an estimation process since the halftoning process cannot be reversed exactly to reproduce a continuous tone image identical to the original image.

One common process for converting continuous tone images to halftone images is a process called ordered dithering. The majority of images currently processed in the printing industry are dithered images since most printers can only print dithered images. Generally, ordered dithering is a process in which a scanned continuous signal from a continuous tone image is converted to a series of black (1 or ink) or white (0 or no ink) pixels with the pixel values determined by the pattern of a threshold or dither matrix to which the scanned signal is applied.

The classic prior art method for converting halftone images to continuous tone images, i.e. for "unscreening" continuous tone images from halftone images, applies a low-pass filter to the halftone image data. The low-pass filter method by its nature typically blurs image edges or at least loses fidelity of edge information (fine detail) as a result of the filter conversion process.

U.S. Pat. No. 4,630,125 to Roetling, and assigned to the present assignee, discloses a method of reconstructing a continuous tone image for greyscale values that have been converted to a halftone image of black and white spots. The reconstruction method involves isolation of each spot of a halftone image along with a neighborhood of surrounding spots, and, for each neighborhood, comparing a maximum screen pattern value producing a white spot with a minimum screen value producing a black spot.

If the minimum screen value giving a black spot is greater than the maximum screen value giving a white spot, then the greyscale pixel value of the isolated spot is the average of the maximum and minimum screen values just described. If the minimum screen value giving a black spot is less than the maximum screen value giving a white spot, then the process is repeated after deleting that portion of the neighborhood of surrounding spots containing the maximum or minimum screen value furtherest from the isolated spot. Use of the Roetling scheme is limited to orthographic or digitally created and stored dithered images since it is based on the regularity of dots in a half-tone image created with a dither.

Another U.S. Pat. No. 4,841,377 issued to Hiratsuka et al. discloses a method for estimating an original continuous tone image from a stored binary image. The method involves, inter alia, setting a plurality of scanning apertures in a binary image formed of a dither matrix, selecting one scanning aperture satisfying a predetermined condition for each picture element of a continuous image to be estimated, and estimating the continuous image on the basis of the number of white or black picture elements in the scanning aperture selected. The Hiratsuka method is similarly limited to dithered halftone images.

More recently, U.S. Pat. No. 5,027,078, issued to the present inventor, Z. Fan, discloses a method for converting halftone images to continuous tone images. The Fan method is an improvement over the Roetling method through the application of "logic filtering." This logic-filter method provides best results for digitally created and stored dithered halftone images.

Additional prior art that has limited relevance to the present invention follows:

1. U.S. Pat. No. 4,722,008, HALFTONE PICTURE PROCESSING APPARATUS", dated Jan. 26, 1988, filed by Hisashi Ibaraki, et al.
2. U.S. Pat. No. 4,811,115, "IMAGE PROCESSING APPARATUS USING APPROXIMATE AUTO CORRELATION FUNCTION TO DETECT THE FREQUENCY OF HALF-TONE IMAGE DATA", dated Mar. 7, 1989, filed by Ying-Wei Lin, et al.
3. U.S. Pat. No. 4,841,377, "CONTINUOUS IMAGE ESTIMATION METHOD", dated Jun. 20, 1989, filed by Seiichiro Hiratsuka, et al.
4. U.S. Pat. No. 4,903,142, "APPARATUS FOR PROCESSING HALFTONE IMAGE", dated Feb. 20, 1990, filed by Takashi Hasebe, et al.
5. U.S. Pat. No. 4,717,964, "IMAGE PROCESSING APPARATUS", dated Jan. 5, 1988, filed by Yoshinori Abe, et al.
6. U.S. Pat. No. 4,901,363, "SYSTEM FOR COMPRESSING BILEVEL DATA", dated Feb. 13, 1990, filed by Kazuharu Toyokawa.

In summary of the prior art, it has generally had shortcomings in preserving edge smoothing and avoiding edge blurring in the "unscreening" of continuous tone images from halftone images. Further, where improved unscreening results have been achieved, as in the Roetling U.S. Pat. No. 4,630,125, such improvement has been limited with respect to the kinds of screen-structured halftone images that can be processed. In the Roetling U.S. Pat. No. 4,630,125, for example, only orthographic halftone images can be processed.

SUMMARY OF THE INVENTION

The present invention is directed to an image processing system in which hybrid filtering is employed to provide improved unscreening of continuous tone images from half-tone screen structured images. The image processing system comprises means for sequentially generating value date for successive pixels of a halftone image, and first means for sequentially filtering each pixel in the halftone image in a first image direction in accordance with a first low pass filter to generate an intermediately filtered image. Second means are provided for sequentially filtering each pixel in the intermediately filtered image in a second image direction in accordance with a second edge preserving filter to generate a hybrid filtered image. Means are provided for generating an output continuous tone image containing the hybrid filtered image pixels for storage or processing to a halftone copy or print.

BRIEF DESCRIPTION OF THE DRAWINGS

The accompanying drawings, which are incorporated in and constitute a part of this specification, illustrate one embodiment of the invention and together with the description provide an explanation of the objects, advantages and principles of the invention. In the drawings:

FIGS. 4–8 show various diagrams that illustrate the manner in which pattern match filtering is applied to a low-pass filtered image in the hybrid filtering procedure.

DESCRIPTION OF THE PREFERRED EMBODIMENT

Figure 1:
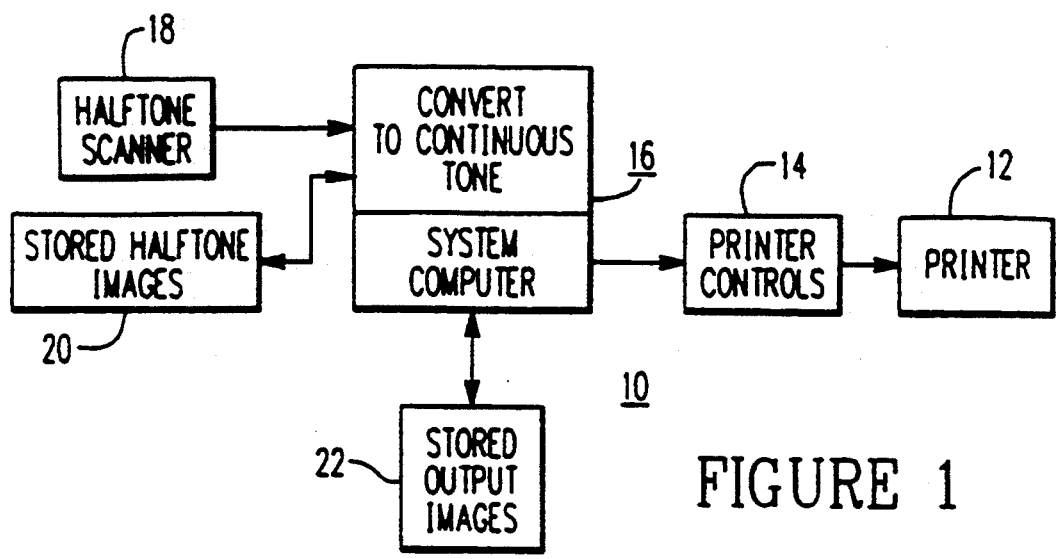
FIG. 1 shows a reprographic system in which the present invention is applied.

An image processing system 10 shown in FIG. 1 includes a conventional printer 12 that is operated in accordance with the invention by printer controls 14 under the control of a system computer 16. Input halftone images are obtained from a scanner 18 or from a first memory 20. Another memory 22 is used to store converted images for output.

In accordance with the invention, input black and white screen-structured images are first converted or "unscreened" to continuous tone images, and thereafter reconverted to halftone images for print processing. If desired, unprocessed halftone images can be stored in another memory (not shown) for subsequent conversion and processing in accordance with the present invention.

The scanned or stored input images are dithered images with a screen structure.

There are various applications in which it is desirable to convert halftone images to continuous tone images. In the preferred image processing embodiment, image conversion from halftone to continuous tone is performed to enable high quality printing.

In all such image conversion applications, the traditional low pass filtering approach has been characterized with blurred edges and loss of fine detail. Other converting techniques have provided some improvement as described hereinabove, but no known techniques have had a capability for high quality edge smoothing, especially in the conversion of both stored or orthographic and scanned screen-structured halftone images.

In accordance with the present invention, the image processing system 10 incorporates a hybrid filter algorithm to provide improved image conversion with improved edge-preservation. Image conversion is preferably implemented with a hybrid filter procedure that preferably employs a low-pass filter and a pattern matching filter. In the description that follows, halftones are defined to have pixel values of 0 and 1, and grey images are defined to have pixel values in the range of 0 to 1 with 0 being white and 1 being black.

In accordance with the broad principles of the invention, the preferred embodiment employs a hybrid filtering procedure in which at least two different filter means are applied in sequence to a screen-structured halftone image in at least two different directions across the image. The hybrid filter means preferably are provided in the form of low-pass filter that is applied to the image in a first image direction and a pattern matching filter that is applied to the image in a second image direction perpendicular to the first direction.

Further, it is preferred that the hybrid filtering procedure be repeated a predetermined number of times with use of a different first direction in each execution of the procedure. In the preferred embodiment, the hybrid filtering procedure is executed four times, with the first direction being the horizontal direction in the first execution, the vertical direction in the second execution, one of the diagonal directions in the third execution, and the other diagonal direction in the last execution. A comparison is made of the image results from the four executions of the procedure and the best image is preferably selected for output on the basis of edging with the best smoothness and least blurring.

The hybrid filtering procedure employs a new algorithm that uniquely combines a low-pass filtering procedure like the adaptive low-pass filtering procedure disclosed in the above referenced copending application 4629-055 and pattern matching filtering, which can be considered conceptually as a generalization of logic filtering disclosed in the referenced Fan U.S. Pat. No. 5,027,078. However, they differ significantly in terms of the data forms and the operation involved. The logic filtering narrows range data using "logic and" operations, whereas the pattern matching filtering decides its output grey values by matching the input grey data patterns to certain templates. As already indicated, the hybrid algorithm performs a two-dimension filtering which is composed of a one-dimensional low-pass filter in one direction and a one-dimensional pattern matching filter in a direction perpendicular to the one direction. The new algorithm uses more information about dot position than the adaptive low-pass filter and less information than the logic filter. The robustness and performance of the hybrid algorithm therefore lie between those of the adaptive low-pass filter and logic filter approaches. The new algorithm can be applied to scanned or stored halftones, but not error diffused halftones. The Fan Patent 5,027,078, which discloses the logic filter approach, is hereby incorporated by reference.

Figure 4:
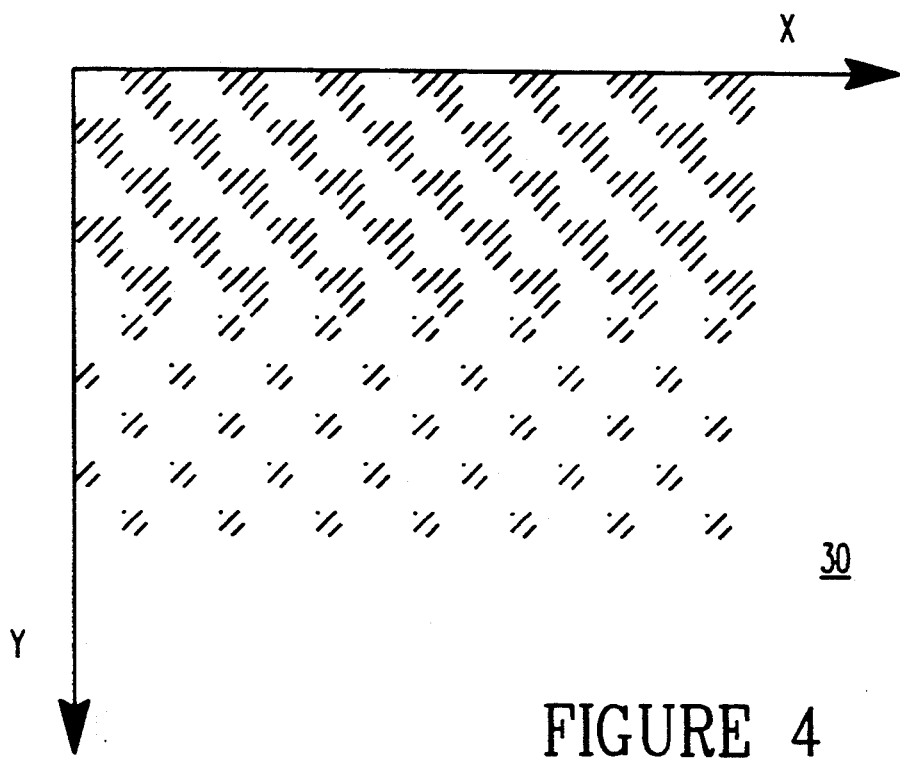

A screen-structured halftone image 30 is shown in FIG. 4 to illustrate application of the hybrid algorithm. The image 30 was created by a 2,2 dot, whose dot growth pattern or dither matrix 31 is shown in FIG. 6.

In FIG. 6, the dither threshold matrix 31 is known in this example to have been used in creating the halftone image 30 from the original continuous tone image. In that creation process, the matrix 31 is masked on the continuous tone image repeatedly in the horizontal direction across the image without overlap. The horizontal masking is moved vertically and repeated without overlap over successive pixel rows until the entire image is dithered. The starting point for the window in successive rows is shifted back and forth in the horizontal direction.

For each placement of the dither matrix 31, the 2×4 blocks located therein are corresponded to pixels that are accorded grey values based on the respective threshold values shown for the respective blocks. Thus, the upper leftmost pixel has a threshold value of 1 (corresponding to $\frac{1}{8}$ in a 0-to-1 grey scale). If the underlying image at that location has a grey value in excess of $\frac{1}{8}$ the corresponding pixel for the halftone image is made black. Otherwise, it is made white. The thresholding process is the same for each of the other 7 pixels, except that the threshold values are different as shown. For example, the second top block has a threshold of 2/8, the third top pixel has a threshold of 8/8 or 1, etc.

Figure 5:
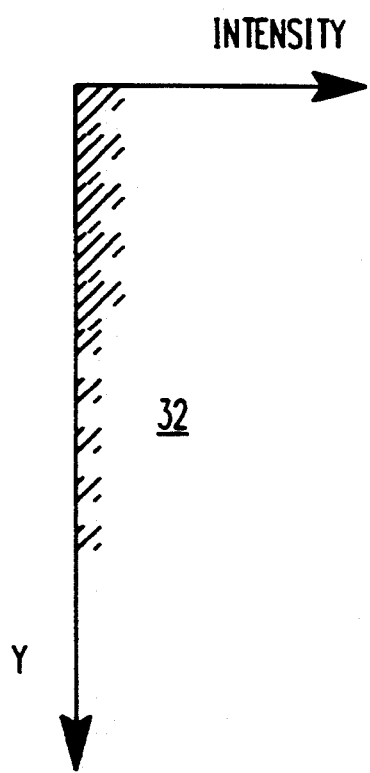

A reasonable estimate of the original continuous tone image from which the halftone image 30 was generated would be two uniform regions separated by a horizontal edge. The original continuous tone image is accurately determined in accordance with the following two-step hybrid filtering procedure:

The halftone image 30 is first low-pass filtered along the horizontal direction, using a $1 \times M_x$ mean filter, where $M_x$ is the horizontal dot period and $M_x = 4$ in this example. A resulting image 32, called a low-pass filtering result (LFR), is shown in FIG. 5. The LFR image in this case is uniform in the horizontal direction and accordingly, only one column is displayed.

With reference to the LFR image 32, each part of the LFR image 32 is matched to horizontal "full dot templates", which, for a certain direction, are sequences of length $N_x$, defined to be the grey patterns obtained from full dot patterns through a one-dimensional low-pass filtering of a uniform area along that direction, where:

$$N_x = (L-1)/M_x \qquad \text{(Equation 1)}$$

L is the number of levels of halftone patterns, with $L=9$ and $N_x = 2$ for this example.

For a certain direction, there is one full dot template for each grey level. FIGS. 7 and 8 show respectively full dot patterns 34 and horizontal full dot templates 36 for the dot growth matrix 31. In this example, the upper and lower halves of the image have best matches to grey level 3 and grey level 1 full dot templates. Pixels in the corresponding regions are accordingly assigned a grey level of 3 or a grey level of 1.

In the above illustration, the horizontal orientation of the edge is assumed to be known a priori, which is usually not the case. To handle the general situation where the edge orientation is unknown, the procedure is performed in several quantized directions (e.g. horizontal, vertical and along two diagonals). The results are then compared for each part of the images. The one which results in a smoothest boundary is chosen as the final output image. In this way, the best hybrid will be the one that most closely has the low-pass filter applied in the edge direction and the pattern matching filter applied in the direction perpendicular to the edge direction.

If full dot patterns are known a priori, or in the case of orthographic halftones, where the full dot patterns can be easily estimated as described in the previously referenced Fan U.S. Pat. No. 5,027,078, the full dot templates can be obtained by simple low-pass filtering. For the scanned halftones, due to the possible geometric distortion during the printing and scanning processes, the estimation of full dot patterns becomes considerably more complicated. Therefore, the full dot templates are preferably estimated directly, instead of being obtained from the full dot patterns.

As pointed out in the previously referenced Fan U.S. Pat. No. 5,027,078, the full dot patterns usually appear more frequently than the partial dot patterns in halftone images. It is therefore also true that the full dot templates have more appearances than other patterns in the LFR images. The estimation of full dot templates for a certain direction such as of length $N_x$. The dot or pixel grey level patterns contained in the horizontal direction is performed as follows:

The LFR image is partitioned into disjoint vertical windows of length $N_x$. The dot or pixel grey level patterns contained in the windows are normalized, registered, and the number of the appearances of each pixel grey level pattern is counted. The pixel grey level pattern with the highest count for a certain level is chosen to be the full dot template for that level. The normalization process assures that the grey level patterns differ from each other only in phase shift, e.g., 986, 869 and 698 are counted as the same grey level pattern. This is significant as in scanned images, it is difficult to know exactly the relative phase shift of different windows. The normalization of a grey level pattern rotates the pattern such that the smallest LFR output appears first, e.g., 698 is the normalized form of 986 869, and 698. More formally, the normalization of a sequence $\{z(0), x(1), \ldots, z(N_x-1)\}$ is to minimize C defined in Equation 2 among all the possible rotations.

$$C = \Sigma_{0 \le i < N_x} z(i) \times Z_M(N_x-i) \qquad \text{(Equation 2)}$$

where $Z_M$ is a number greater than the maximum possible value of $z(i)$. As an example, suppose the value of $z(i)$ ($i=0, 1, 2$) is between 0 and 15. $Z_M$ is chosen to be 16. C for 698 is $6 \times 16^2 + 8 \times 16 + 9 = 1688$, which is verified to be smaller than C for 986 and 869.

Pattern matching is performed line by line over the LFR image 32 along the direction perpendicular to the direction of the low-pass filtering. The low-pass filtering is horizontal in this example and pattern matching is thus performed column by column in the vertical direction.

For a column x, the data within one-dimensional window W centered at pixel $Y_o$, is compared to the full dot templates of level K. For simplicity, the pixels are indexed by y coordinates only, since only pixels in the same column are of concern here. The window size is $N_x$ as defined in Equation 1. K is chosen to minimize the following distance measure $D_k$:

$$D_k = \min_{i_0} \Sigma_{y_0+i \Sigma w} |z(y_o+i) - f_K[(i_o+i) \bmod N_x]| \qquad \text{(Equation 3)}$$

where $z(x, y_o+i)$ is the LFR data within the window W, $f_K$ is the full dot template of the level K, and $i_o$ is the initial phase shift of $f_K$.

Varying $i_o$ takes care of the relative phase shift of the window W to $f_K$. $D_K$ is equal to zero, if the grey level pattern contained in the window is a full dot template of the level K. A grey level K is assigned to pixel $(x, y_o)$ if the following is true:

$$\min_K D_K \leq D_{max} \quad \text{(Equation 4)}$$

where the threshold $D_{max}(D_{max}>)$ controls the tolerance level of the noise.

A failure of Equation 4 indicates the existence of a step edge. The window W then is slid back and forth in such a way that the window W still contains $y_o$, but it is not centered at $y_o$, to determine whether a better fit can be obtained. This procedure is an effort to assign the grey level of one side of the edge to $y_o$. The steepnees of the edge is thus preserved.

If Equation 4 fails again, which happens only in the cases where $y_o$ is located in an area of fine detail, the window size is reduced until Equation 4 is satisfied. The convergence of the above process is guaranteed, since for a window size of one pixel, there always exists at least one K such that $D_K$ is equal to 0.

In the case of a reduced window size, the data in the window actually tries to match a portion of a full dot template. There are usually multiple matches, i.e., several K values with the same $D_K$ value satisfied (Equation 4). The K value which is the closest to the grey level of the dot in the initial nonreduced window is chosen.

For example, a LFR {1, 4, 0, . . . } is supposed to match the full dot templates shown in FIG. 8 with $D_{max}$ being 0. For the second pixel, an initial window of size 2 contains {1, 4}. No match can be found even if the window slides, which then contains {4, 0}.

For a window size of 1 pixel, which contains {4}, full dot templates {2,4}(K=6), {3,4}(K=7), and {4,4}(K=8) all satisfy Equation 4. K=6 is chosen in this case, since it is closest to 5, which is the grey level of {1,4}, the data in the original window.

PROGRAMMED COMPUTER PROCEDURE EMPLOYING HYBRID FILTERING TO UNSCREEN A HALFTONE IMAGE

Figure 3A:
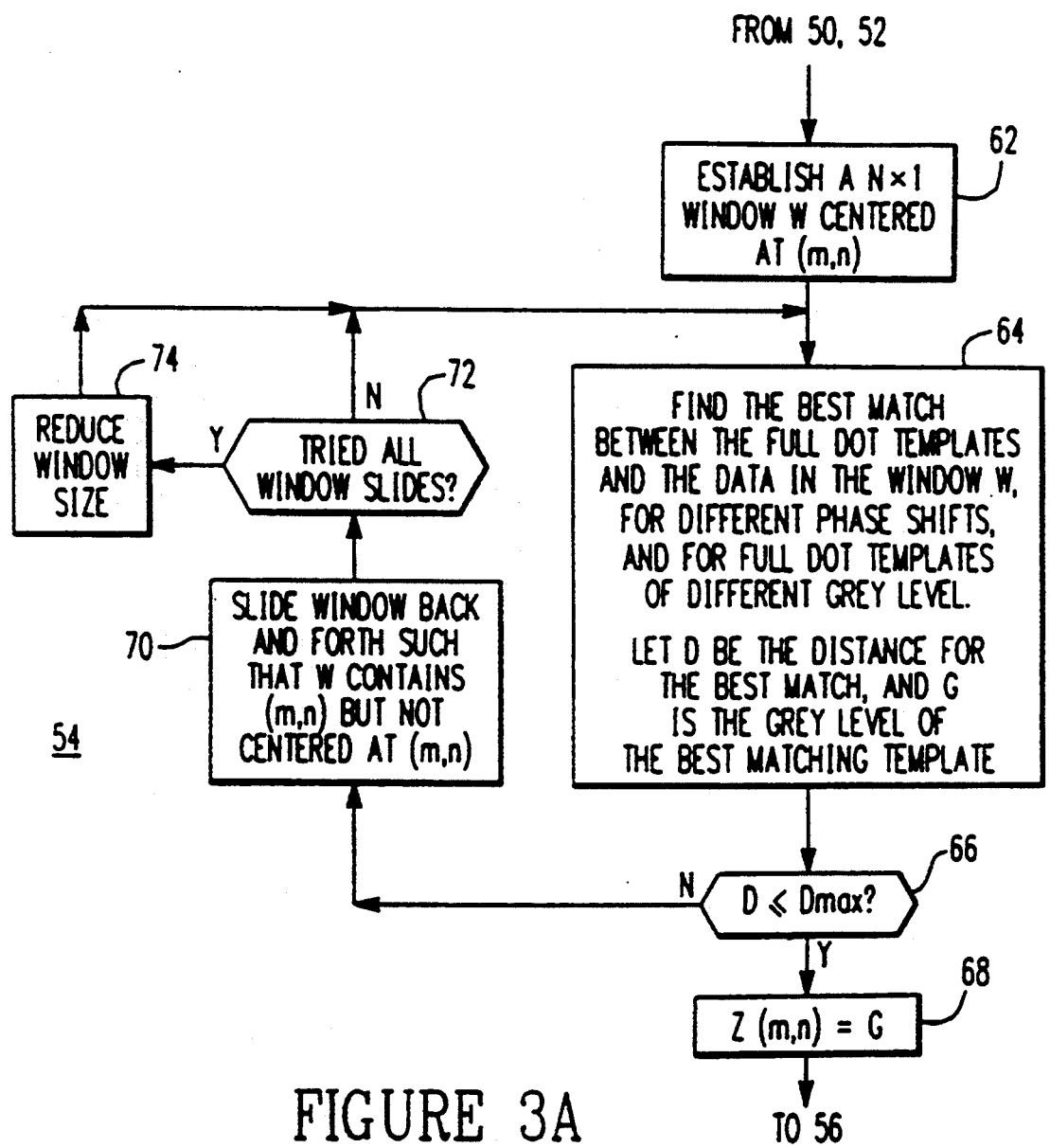
FIGS. 2 and 3B, 3B show a flow chart representing a programmed procedure for converting a halftone image to a continuous tone image with the use of hybrid filtering in accordance with the present invention.
Figure 2:
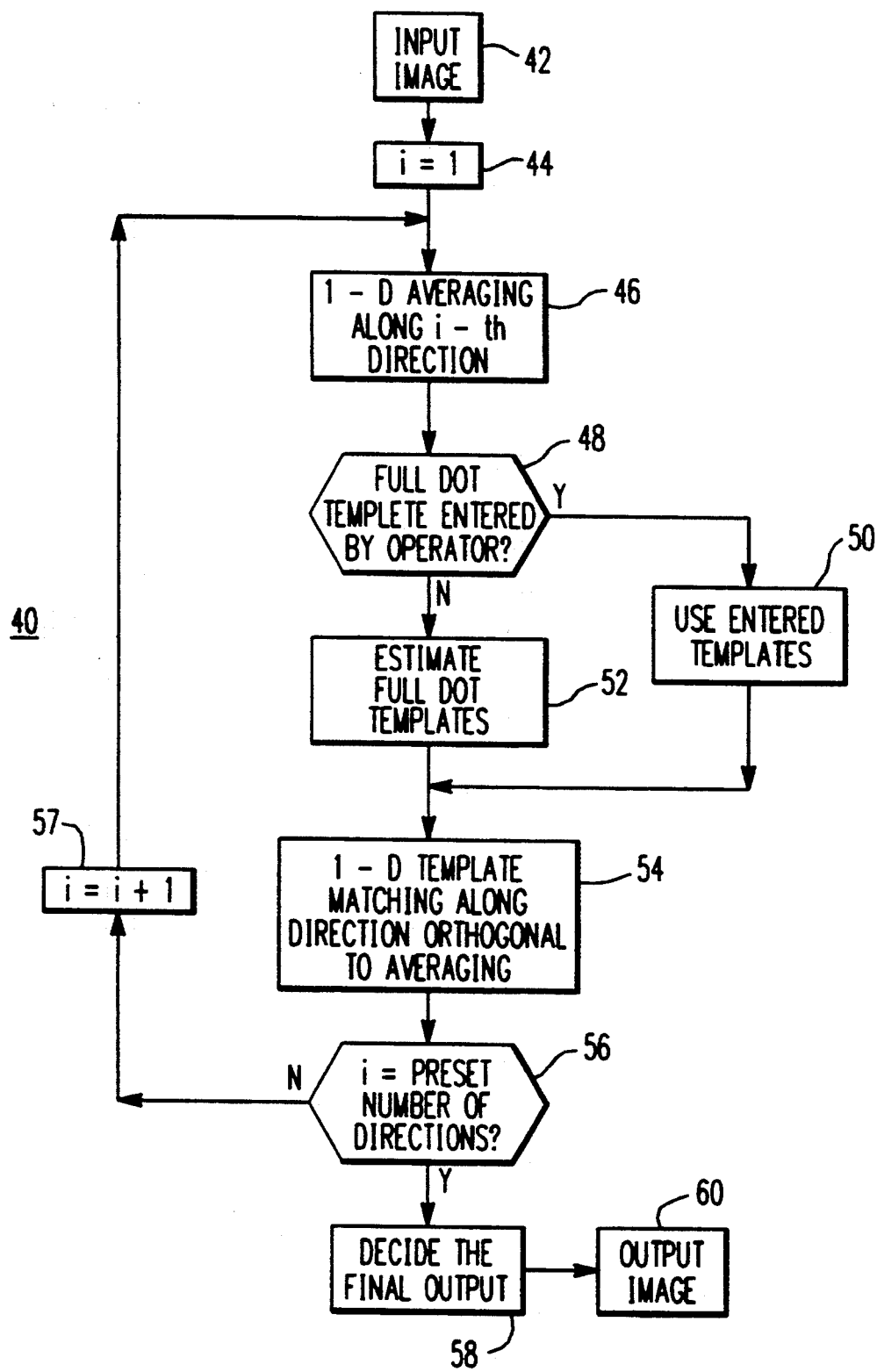
Figure 3B:
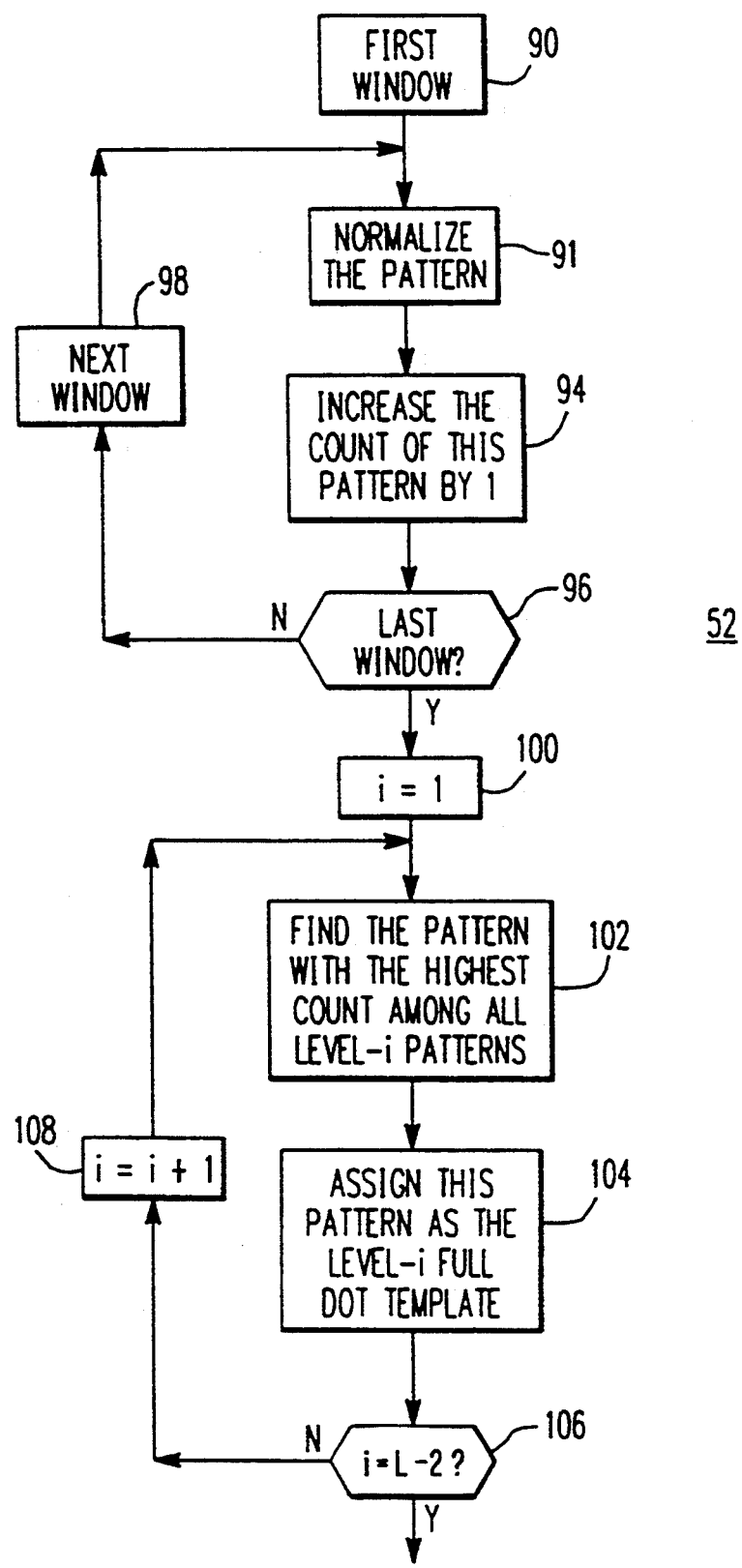

As shown in FIGS. 2, 3A, and 3B, a flow chart 40 shows in greater detail the preferred hybrid filtering procedure for unscreening halftone images. A block 42 obtains the halftone image data and a counter i is set by a block 44 to a value of 1 to indicate that the hybrid filtering procedure for a first set of directions for the two filters, i.e., the horizontal and vertical directions in this case.

A block 46 performs low-pass filtering for all image pixels along the horizontal direction in this first program pass. Generally, a $M_x \times 1$ filter is employed to determine, through averaging, the grey value for each pixel in the LFR image.

Next, in a test block 48, a determination is made as to whether the threshold matrix for the halftone image being processed is known, i.e., whether the operator has entered the matrix 31 from which the full dot patterns and full dot templates are determined. If so, a block 50 directs program usage of the entered templates.

If not, a block 52 estimates the full dot templates in accordance with a routine shown in greater detail in FIG. 3B. After the full dot templates have been specified, a block 54 performs the next filtering action for all pixels in the LFR image, i.e., it performs template/LFR pattern matching in the vertical direction which is perpendicular to the low-pass filter direction and generates a resultant image. Pattern matching is shown in greater detail in FIG. 3A.

After completion of the hybrid filtering in the blocks 46 and 54, a test block 56 checks the i counter to determine whether another loop pass is required to process another filter direction. If so, the count in the i counter is advanced by 1 and a return is made to the block 46. The described program flow is repeated for successive filter directions until the preset number of filter directions is reached. A resultant filtered image is generated with each loop pass.

In the preferred embodiment, a second loop pass is made with low pass filtering with use of a $1 \times M_y$ filter in the vertical direction and pattern matching in the horizontal direction. Third and fourth loop passes are executed for two diagonal directions as previously indicated.

A block 58 compares the image results from the four hybrid filter executions, and selects the best one for output in a block 60. The selection is made on the basis of edge smoothness as more fully disclosed in the referenced Fan U.S. Pat. No. 5,027,078.

In the pattern matching routine 54 (FIG. 3A), a block 62 first establishes an $N \times 1$ window W centered at (m,n). In the preferred embodiment a $2 \times 1$ window is employed.

A block 64 then finds the best pattern match between the full dot templates and the pixel data in the window W for different phase shifts in pixel values and for full dot templates of the different grey levels.

If the best pattern match has a distance difference D that is equal to or less than a noise tolerance threshold Dmax, a block 68 sets the current pixel value equal to G which is the grey level of the best matching template.

Otherwise, a block 70 slides the window to make another try for a pattern match. The program flow loops through the blocks 64, 66, and 70 until a test block 72 indicates that all slide possibilities have been tried or until a pattern match is found by the block 66.

When all slides have been tried, a block 74 reduces the window size to try again for a pattern match. Program flow then loops again in the manner described until a pattern match is found or until the window size has to be further reduced.

If the window size reaches a single pixel, a pattern match is then necessarily found by the block 66. After all LFR image pixels have been processed by the routine 54, the block 56 (FIG. 2) operates as previously described.

As shown in FIG. 3B for the full-dot-template estimating routine 52, a block 90 in a flow path 91 applies a first window to the image and a block 92 normalizes the pattern as previously described so that only one count is made for all phase shifted variations of the same pattern.

A block 94 then increases the count of the current pattern by 1 and a test block 96 checks for more windows. If one or more windows are still to be processed, a block 98 calls the next window and the flow path 91 is reexecuted for the next window.

When the last window has been completed, different patterns have respective resultant counts, and a block 100 sets an iteration counter i to 1. A block 102 then finds the pattern with the highest count for level-i patterns, and a block 104 assigns that pattern as the full dot template for level-i.

A block 106 checks to determine whether all levels of halftone patterns (L−2) have been processed. If not, a block 108 sets the counter i to i+1 and the pattern for the next level is estimated in the blocks 102 and 104 as described. When all of the halftone level patterns have been determined, the block 106 causes an exit from the routine 52 to the block 54 in FIG. 2. Full dot templates for level 0, and level L−1 are always {0,0, . . . 0} and {Mx,Mx . . . Mx} respectively, and do not have to be estimated.

The following illustrates matching in accordance with the invention:

--- a) Pixel    0    1    2    3    4    $N_x = 2$   $D_{max} = 0$
   Input   $\frac{2}{4}$   $\frac{3}{4}$   $\frac{2}{4}$   $\frac{3}{4}$ For pixel 0, window W contains $\frac{2}{4}$ $\frac{3}{4}$, which matches full dot template $\frac{5}{8}$ with D = 0. $Z(0) = \frac{5}{8}$ For pixel 1, window W contains $\frac{3}{4}$ $\frac{2}{4}$, which matches full dot template $\frac{5}{8}$ (with one pixel shift) with D = 0. $Z(1) = \frac{5}{8}$ Pixel 2 same as pixel 0. $Z(2) = \frac{5}{8}$ For pixel 3, window W contains $\frac{3}{4}$, 0 which does not match any full dot template. Sliding window back one pixel so that W contains $\frac{2}{4}$ $\frac{3}{4}$. A match is then found for template $\frac{5}{8}$ with D = 0. $Z(3) = \frac{5}{8}$.

b) Pixel    0    1    2    3    $N_x = 2$   $D_{max} = 0$
   Input   $\frac{2}{4}$   $\frac{1}{4}$   $\frac{4}{4}$ For pixel 2, W contains $\frac{4}{4}$, 0, no match.

Slide window back one pixel. W contains $\frac{1}{4}$, $\frac{4}{4}$. No match either.

Reduce window size 1, W contains $\frac{4}{4}$. It matches $\frac{6}{8}$, $\frac{7}{8}$ and $\frac{8}{8}$. $\frac{6}{8}$ is chosen as output, since it is closest to $\frac{4}{8}$, which is the grey level of the data in the original window $\frac{4}{4}$, 0.

---

Figure 9A:
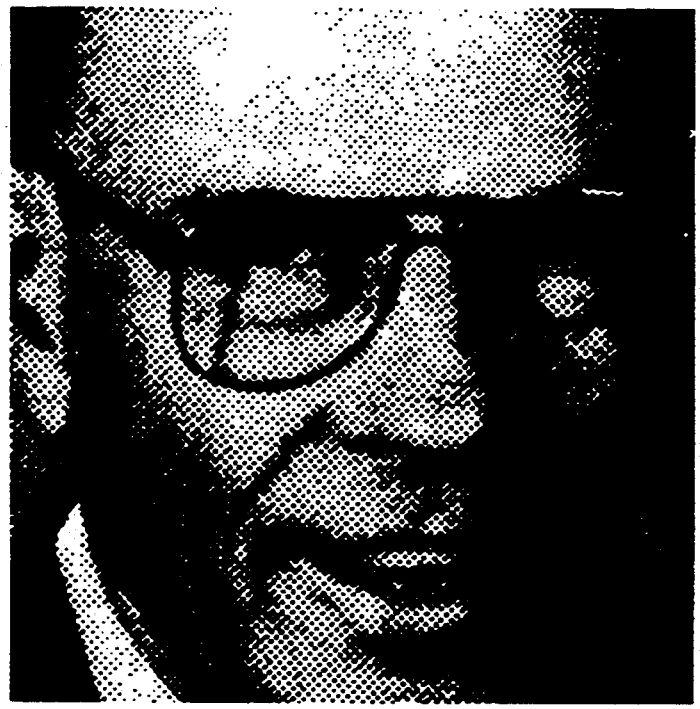
FIGS. 9A and 9B respectively show a scanned image and an unscreened image resulting from application of the invention to the scanned image.
Figure 9B:

In FIGS. 9A and 9B, image results are shown for an experimental application of the present invention. The image in FIG. 9A is halftone image scanned by an Inca scanner, with a resolution of 600 spi. The halftone is 100 dot/inch. The image of FIG. 9B is the unscreening result. $D_{max}$ was chosen to be 2. Both images are printed with a scale of 4.

The foregoing description of the preferred embodiment of the invention has been presented for purposes of illustration and description. The description is not intended to be exhaustive or to limit the invention to the precise form disclosed, and modifications and variations of the invention are possible in light of the above disclosure or may be acquired from practice of the invention. It is intended that the description provide an explanation of the principles of the invention and its practical application to enable one skilled in the art to use the invention in various embodiments and with various modifications as are suited to the particular use contemplated. It is intended that the scope of the invention be defined by the claims appended hereto, and their equivalents.

What is claimed is:

1. An image processing system for converting screen structured halftone images to continuous tone images, said system comprising:
   means for sequentially generating value data for successive pixels of a halftone image;
   first means for sequentially filtering each pixel in the halftone image in a first image direction in accordance with a first low pass filter to generate an intermediately filtered image;
   second means for sequentially filtering each pixel in the intermediately filtered image in a second image direction in accordance with a second edge preserving filter to generate a hybrid filtered image;
   means for generating an output continuous tone image containing the hybrid filtered image pixels for storage or processing to a halftone copy or print;
   said first filter being an averaging filter and said second filter being a pattern matching filter;
   means for determining full dot templates for the input halftone image;
   the second image direction for said pattern matching filter being perpendicular to the first direction for said averaging filter; and
   said pattern matching filter including means for finding the best match between the full dot templates and pixel data in a predetermined filter window.

2. The image processing system of claim 1, wherein means are provided for sliding said window back and forth to find the best match under predetermined conditions of comparison between said full dot templates and the pixel data in said filter window.

3. The window processing system of claim 1, wherein means are provided for reducing the window size to find the best match if all window slides have been tried without satisfying said comparison conditions.

4. An image processing system for converting screen structured halftone images to continuous tone images, said system comprising:
   means for sequentially generating value data for successive pixels of a halftone image;
   first means for sequentially filtering each pixel in the halftone image in a first image direction in accordance with a first low pass filter to generate an intermediately filtered image;
   second means for sequentially filtering each pixel in the intermediately filtered image in a second image direction in accordance with a second edge preserving filter to generate a hybrid filtered image;
   means for generating an output continuous tone image containing the hybrid filtered image pixels for storage or processing to a halftone copy or print;
   said first means filtering the halftone image in multiple different first directions in an equal multiple of respective iterative operations of said first and second means to generate respective different intermediately filtered images,
   said second means filtering the respective intermediately filtered images in respective different second directions in the respective iterative operations to generate respective hybrid images;

means for comparing said respective hybrid images to determine the best hybrid image for storage and/or processing to a halftone copy or print and to determine the best edge preservation in determining the best hybrid image;

means for determining full dot templates for the input halftone image;

the second image direction for said pattern matching filter being perpendicular to the first direction for said averaging filter; and said pattern matching filter including means for finding the best match between the full dot templates and pixel data in a predetermined filter window.

5. The image processing system of claim 1 wherein said determining means includes means for estimating said full dot templates when the full dot templates for the input halftone image are unknown.

* * * * *